United States Patent [19]

Gray

[11] 4,344,266
[45] Aug. 17, 1982

[54] COLLAPSIBLE STRUCTURE AND METHOD OF BUILDING USING SUCH A STRUCTURE

[75] Inventor: Paul D. Gray, Billericay, England

[73] Assignee: Magnex Limited, Douglas, Isle of Man

[21] Appl. No.: 178,543

[22] Filed: Aug. 15, 1980

Related U.S. Application Data

[63] Continuation of Ser. No. 959,178, Nov. 9, 1978, abandoned.

[51] Int. Cl.³ .............................................. B32B 3/12
[52] U.S. Cl. ...................................... 52/742; 52/799; 52/806; 156/71; 428/118; 428/138; 428/913
[58] Field of Search ............... 52/169.5, 169.9, 169.11, 52/169.14, 742; 156/71, 197; 428/116, 913, 138, 73

[56] References Cited

U.S. PATENT DOCUMENTS

| 2,567,706 | 9/1951 | Hannum et al. | 428/913 X |
| 2,609,068 | 9/1952 | Pajak | 428/116 X |
| 2,663,915 | 12/1953 | Dietrich | 52/169.11 X |
| 2,839,442 | 6/1958 | Whitaker | 428/116 X |
| 2,899,771 | 8/1959 | Burris, Jr. | 52/169.14 |
| 3,445,322 | 5/1969 | Saiia et al. | 52/169.14 X |
| 3,859,125 | 1/1975 | Miller et al. | 428/116 X |

Primary Examiner—Henry F. Epstein

[57] ABSTRACT

A collapsible structure comprises a separating structure of poor wet strength sandwiched between two sheets of material, at least one of which is of such a nature as to allow the passage of moisture. The invention also includes a method of building using such a structure.

2 Claims, 1 Drawing Figure

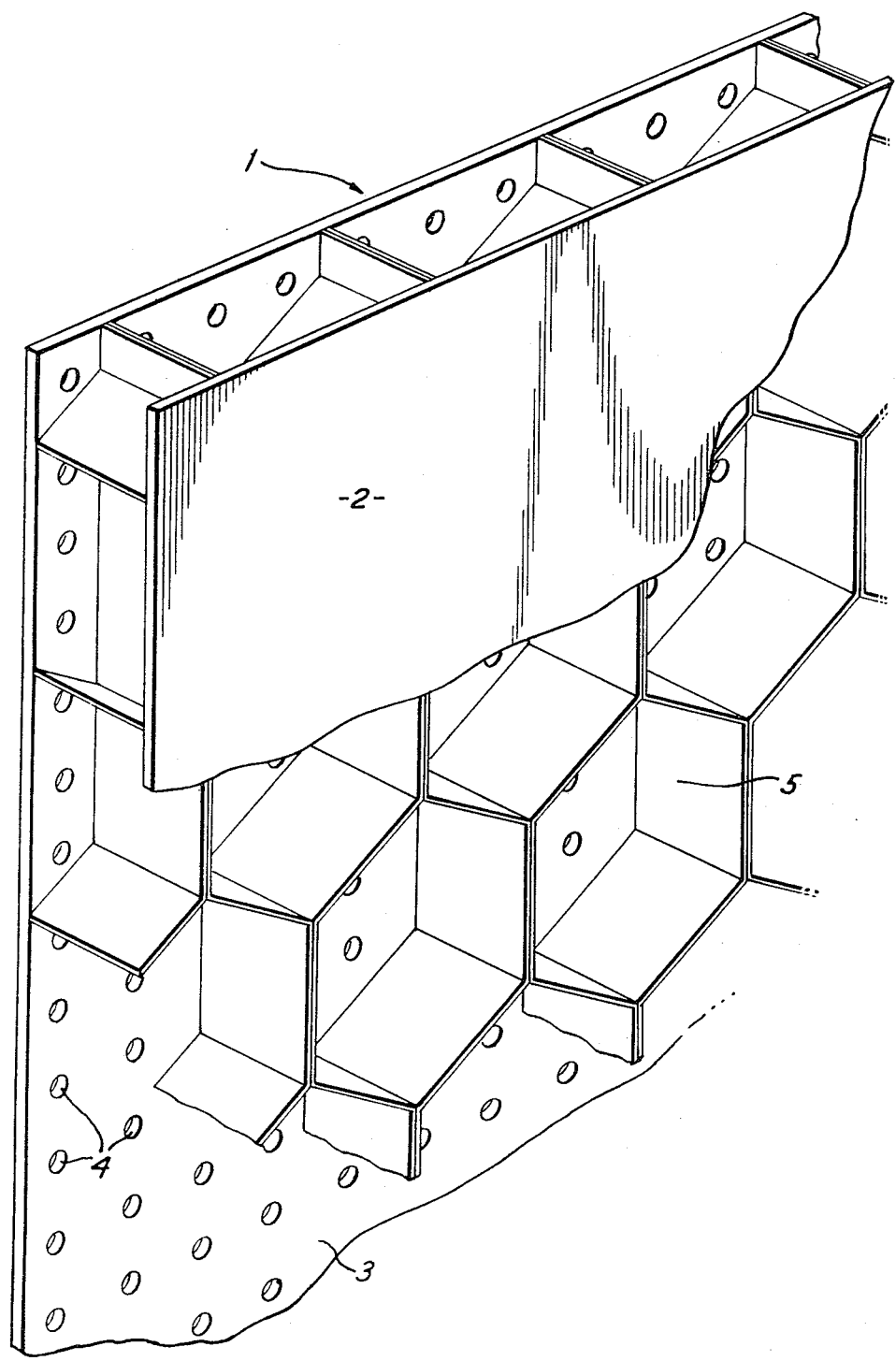

COLLAPSIBLE STRUCTURE AND METHOD OF BUILDING USING SUCH A STRUCTURE

This is a continuation of application Ser. No. 959,178, filed Nov. 9, 1978 and now abandoned.

BACKGROUND OF THE INVENTION

This invention relates to a collapsible structure which can be suitable for use in building construction and to a method of building using such a structure.

With present day building methods, and in particular the provision of concrete floors on the ground floors of houses, considerable trouble has occurred where such floors are laid onto subsoils which are predominantly of a clay nature. The problem which arises depends upon the fact that clay will swell when moisture is introduced and will shrink when moisture is removed. In the case of clay situated under a house, the difference in level between dry clay and wet clay can be as high as 30 mm.

Thus, variations in the condition of the clay can have a very serious effect on any flooring material which is laid directly thereon, and when this flooring material is in contact with walls, the variations can cause severe damage to the building to which it belongs. In fact, this damage can be so severe that the building has to be demolished as being uneconomical to repair.

In order to overcome this problem it has been proposed to provide precast floor elements which can be mounted in position leaving a void between the underside and the ground. However, this process is of a very costly nature because, in most instances, it necessitates the transport of large concrete blocks and the provision at the site of a relatively large crane in order to unload the concrete elements and to place them in their appropriate position. As a result, other means have been tried to introduce between the floor and the clay a material which is sufficiently compressible to allow the movement of the clay to take place but of sufficient strength to form a firm base for the casting of the appropriate floor. Such proposals have included expanded polystyrene, ash and uncompacted sand. However, these have not proved satisfactory since where they are strong enough to support the load during casting of a concrete floor, they are insufficiently compressible to allow for full expansion and contraction of the clay and vice versa.

SUMMARY OF THE INVENTION

It is an object of the invention to provide a structure which is generally rigid initially but which can be caused to collapse under certain conditions and a method of building using such a structure.

According to a first aspect of the invention, there is provided a collapsible structure comprising first and second sheets of material with at least one said sheet permitting passage of moisture and a separating structure of poor wet strength sandwiched between said first and second sheets of material.

Further according to this aspect, there is provided a collapsible structure comprising first and second sheets of material, a separating structure of poor wet strength sandwiched between said first and second sheets of material and means in at least one of said first and second sheets of material for allowing passage of moisture.

According to a second aspect of the invention, there is provided a method of building comprising laying a collapsible structure comprising first and second sheets of material with at least one said sheet permitting passage of moisture and a separating structure of poor wet strength sandwiched between said first and second sheets of material on the ground with its said at least one sheet of material face downwards and forming flooring on said collapsible structure.

BRIEF DESCRIPTION OF THE FIGURE

The invention will now be described in greater detail, by way of example with reference to the FIGURE, the single FIGURE of which is a perspective view of a corner of a board having a collapsible structure, partly cut away.

DESCRIPTION OF THE PREFERRED EMBODIMENT

Referring to the drawing, the collapsible board 1 comprises two outer skins or sheets 2 and 3 of hardboard, the skin 2 intended to be in the upper position being unbroken. The underneath skin 3 is provided with a number of perforations 4. Between the two skins there is arranged a honeycomb structure 5 of a water soluble paper, e.g. reconstituted paper and in the form shown has a hexagonal honeycomb construction.

In use in building construction, when the ground has been prepared and the foundations laid, the boards are laid with their perforated face downwardly on the clay surface and the top of the board is covered by suitable damp proof membrane, for example polythene. Once in position, the floor can be cast thereon in the usual fashion for reinforced concrete and compacted in the usual way.

With suitable dimensions of the board, even when the clay is very wet, the board will remain firm during the period which is necessary to set the concrete, i.e. a period in excess of sixteen hours. At the end of this period, the moisture from the clay seeps through the perforations 4 in the skin 3 and causes disolution of the glue and disintegration of the honeycomb structure. Thus with any swelling of the clay, the skin 3 can be pushed upward with virtually no resistance until it reaches the skin 2, thus providing ample room for expansion of the clay. It is necessary for the thickness of the boards to be of the order of 30 mm since this is normally considered the maximum expansion of clay but for safety factor reasons it may be somewhat larger. It is to be noted that there is no need for the edges of the board to be closed and in fact such closure would be detrimental to the compressibility of the board.

It is to be understood that various modifications may be made to the above described embodiment without departing from the scope of the invention. For example the honeycomb structure which has been provided may be replaced by other forms of honeycomb structure or indeed could be replaced by longitudinal webs. The arrangement of the apertures in the skin could be different to that shown and in fact larger and less numerous apertures could be used. If desired, for purposes of uniformity of construction or reversibility of the board, both skins may be perforated. While water soluble paper and glue are preferred, it would be possible to use as a honeycomb structure a material having a low wet strength and to rely on the destruction of the honeycomb without the necessity of arranging for it to become unglued. However, it is pointed out that this modification is less desirable than the use of water soluble materials since the use of the water soluble material will provide for a better certainty of early compressibility. If desired, in certain circumstances the hardboard used for the skins could be replaced by other suitable materials, such as plastics sheet.

It will be understood that the above description of the present invention is susceptible to various modification changes and adaptations.

What is claimed is:

1. A method of constructing a castable flooring atop subsoil subject to swelling when moistened comprising, providing a vertically collapsible composite board assembly including normally spaced apart upper and lower sheets having a separating structure of poor wet strength sandwiched therebetween, selecting said separating structure having a plurality of spaced apart components of sufficient initial dry strength to rigidly support said upper sheet in a manner spaced above said lower sheet and against the weight of a poured castable flooring during its setting period, said lower sheet allowing passage of moisture therethrough from said moistened subsoil to said spacing separating structure, laying said board assembly with said lower sheet over said subsoil, pouring a castable flooring atop said board assembly upper sheet whereby, following setting of said flooring, moisture from said subsoil penetrates said lower sheet causing disintegration and permanent collapse of said separating structure while allowing displacement of said lower sheet toward said upper sheet and into the space formerly occupied by at least a portion of said separating structure as said moistened subsoil swells upwardly.

2. A method as defined in claim 1, and comprising laying a damp proof membrane on said upper sheet of said collapsible board assembly before pouring said flooring thereon.

* * * * *